United States Patent
Deisinger et al.

(10) Patent No.: US 10,082,165 B2
(45) Date of Patent: Sep. 25, 2018

(54) FASTENER FOR BELLOWS, HAVING A MALE AND A FEMALE END SEGMENT

(71) Applicant: GKN Driveline International GmbH, Lohmar (DE)

(72) Inventors: Markus Deisinger, Siegburg (DE); Ralf Schumacher, Köln (DE); Joachim Wette, Hennef (DE); Daniela Ballas, Remscheid (DE); Andreas Gehrke, Siegburg (DE); Ludger Wenning, Neunkirchen-Seelscheid (DE); Achim Pfeifer, Siegburg (DE); Maik Lehmann, Seelscheid (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 15/333,532

(22) Filed: Oct. 25, 2016

(65) Prior Publication Data
US 2017/0108021 A1     Apr. 20, 2017

Related U.S. Application Data

(63) Continuation of application No. PCT/EP2015/060034, filed on May 7, 2015.

(30) Foreign Application Priority Data

May 9, 2014    (DE) .......................... 10 2014 106 596

(51) Int. Cl.
   *F16B 2/08*     (2006.01)

(52) U.S. Cl.
   CPC ..................................... *F16B 2/08* (2013.01)

(58) Field of Classification Search
   CPC ........ F16L 33/02; F16B 2/08; Y10T 24/1457; Y10T 24/148
   See application file for complete search history.

(56) References Cited

U.S. PATENT DOCUMENTS

| 5,001,816 A | * | 3/1991 | Oetiker | F16B 2/08 24/20 CW |
| 5,150,503 A | * | 9/1992 | Muller | F16B 2/08 24/20 EE |
| 5,185,908 A | | 2/1993 | Oetiker | |

(Continued)

FOREIGN PATENT DOCUMENTS

| DE | 4009259 A1 | 10/1990 |
| DE | 4021746 A1 | 1/1992 |

(Continued)

OTHER PUBLICATIONS

International Search Report and Written Opinion for PCT/EP2015/060034 dated Aug. 4, 2015 (w English translation; 14 pages).

(Continued)

*Primary Examiner* — Robert John Sandy
*Assistant Examiner* — Rowland Do
(74) *Attorney, Agent, or Firm* — Bejin Bieneman PLC (57) ABSTRACT

A fastener, in particular for bellows, comprises a male end segment and a female end segment complementary to the male end segment. The fastener can be used to fasten bellows to joint housings and/or shafts, said fastener having improved closing behavior.

19 Claims, 8 Drawing Sheets

(56) References Cited

U.S. PATENT DOCUMENTS

| | | | |
|---|---|---|---|
| 5,768,752 A * | 6/1998 | Oetiker | F16L 33/02 24/20 CW |
| 6,421,886 B1 | 7/2002 | Oetiker | |
| 6,511,380 B1 * | 1/2003 | Oetiker | F16B 2/08 277/636 |
| 2012/0061076 A1 | 3/2012 | McDaniel et al. | |
| 2017/0108021 A1 | 4/2017 | Deisinger | |

FOREIGN PATENT DOCUMENTS

| | | |
|---|---|---|
| DE | 4009259 C2 | 3/2001 |
| DE | 10032331 C1 | 9/2001 |
| DE | 69708164 T2 | 8/2002 |
| EP | 0802333 A1 | 10/1997 |
| EP | 1930644 A1 | 6/2008 |
| WO | 99/39123 A1 | 8/1999 |

OTHER PUBLICATIONS

International Search Report and Written Opinion for PCT/EP2015/060038 dated Aug. 11, 2015 (with English translation; 14 pages).
International Preliminary Report on Patentability for PCT/EP2015/060034 dated Nov. 15, 2016 (9 pages).
Non-Final Office Action dated Sep. 19, 2017 for U.S. Appl. No. 15/333,527 (24 pages).

* cited by examiner

FASTENER FOR BELLOWS, HAVING A MALE AND A FEMALE END SEGMENT

CROSS-REFERENCE TO RELATED APPLICATIONS

This application is a continuation of and claims priority to Patent Cooperation Treaty Application No. PCT/EP2015/060034, filed on May 7, 2015, which claims priority to German Application No. DE 10 2014 106 596.4 filed on May 9, 2014, each of which applications are hereby incorporated herein by reference in their entireties.

BACKGROUND

Means for fastening bellows produced from elastomer materials, in particular pleated bellows and roller bellows, are well known. Thus, for some time so-called mutually overlapping retaining straps have been available that attain a clamping effect by tautening the two free strap ends with suitable means. However, the pleated bellows can be damaged in the region of the free strap ends, and the latter also require considerable space for installation. A number of so-called endless annularly closed clamping rings have therefore been suggested in the past. Their diameter is reduced by crimping, i.e., by radial compression by means of suitable tools, so that during the crimping process a bellows is ultimately securely held on a fastening body, for instance, a joint housing or a shaft.

To produce such endless annularly closed clamping rings, it is known to roll tape pieces trimmed from an endless tape material and butt-weld them to one another perpendicular to the center line of the ring, but this technique is very time-consuming. In contrast, instead of such welding, known from DE 40 21 746 A1 is providing on the first and second free ends of a tape segment outside and inside closure strips that are embodied complementary to one another and have undercut regions so that, when the closed connection is under tensile load, inwardly directed forces that permit a point connection of the two complementary closure strips act on the outer closure straps. An end region may be embodied, for instance, such that an essentially T-shaped head piece is embodied thereon, while the second end region complementary hereto provides a jaw-shaped fork adapted to the first end region, the two end regions linearly butting and engaging one another. A plurality of dovetail or T-shaped strips may also be provided on the ring width. Such endless annularly closed tensioning rings described in DE 40 21 746 A1 have become known as such with a so-called puzzle lock. However, it is a disadvantage of the endless tensioning ring known from DE 40 21 746 A1 that these can open occasionally, whether during transport to the consumer or user of the closed endless tensioning rings, or whether during use of the latter, for instance for retaining pleated bellows or roller bellows on outer joint housing parts or shafts. There is therefore a need for fasteners that have improved closure of the two free ends of a strip-like segment for forming an endless tensioning ring.

SUMMARY

Disclosed herein is a fastener, in particular for bellows, comprising a male end segment and a female end segment complementary to the male end segment, as well as the use thereof for fastening bellows on joint housings and/or shafts, which fastener has an improved closing behavior. The fastener has at least one undercut region being embodied in the male end segment.

The fastener, in particular for bellows, comprises a male end segment and a female end segment complementary to the male end segment, each having at least a first transversal undercut region, and wherein a first width $b_1$ of the male end segment is determined either by the minimum width $b_1$ of a first foot segment extending away from a first base in the first male transversal undercut region, or, if there is a recess that is arranged displaced beyond the base in a length direction of the fastener, by minimum widths $b_{11}$ and $b_{12}$ of longitudinal segments in the region of the recess, and wherein the female end segment has a first and a second outer longitudinal segment, each having a second minimum width $b_{21}$ and $b_{22}$ in the region of the first female transversal undercut and, possibly, having an innerly disposed transversal undercut region with a second foot segment, wherein the latter extends away from a second base and has a third minimum width $b_3$ in the innerly disposed transversal undercut region, wherein $b_1:(b_{21}+b_{22}+b_3)$ or $(b_{11}+b_{12}):(b_{21}+b_{22}+b_3)$ is in a range from approximately 0.79 to approximately 1.27.

The specific cross-sectional width ratios help to ensure that, given the many stresses to which the fastener is exposed during use, it experiences only slight crack formation between the contact surfaces of the male and female end segments so that the service life in use is extended. Apart from the claimed ranges for the cross-sectional width ratio $b_1:(b_{21}+b_{22}+b_3)$ or $(b_{11}+b_{12}):(b_{21}+b_{22}+b_3)$, wherein $b_3$ is only to be taken into consideration if there is an innerly disposed transversal undercut region, analyses of a number of generic fasteners using finite element methods have found the occurrence of transversal crack formations, that is, those transverse to a longitudinal extension of the fastener, especially immediately adjacent to an outer wall of the fastener. These occur in particular when there is tensile-bending strain. With the present fastener, these crack formations are significantly reduced or do not occur.

Both the male and the female end segments may have a first transversal undercut region, but they may also each additionally have a second or third or fourth transversal undercut region. The number of transversal undercut regions in the male end segment and in the female end segment is always equal. The possibly present at least one innerly disposed transversal undercut region of the male end segment likewise has a counterpart in an innerly disposed transversal undercut region of the female end segment. It is possible that exactly one innerly disposed transversal undercut region is present in the female end segment and in the male end segment. In the context of the present application, a first transversal undercut region relative to the male and female segments shall be construed to mean the transversal undercut region next to the base of the male segment, wherein in the case of the female end segment this refers to the fastener being in the closed condition. Alternatively, with respect to the female segment when the fastener is in the open condition, the first transversal undercut region may be defined as the undercut region next to an end of the female end segment. The end of the female end segment is associated with the base of the male end segment in the closed condition or is immediately adjacent thereto. If only one transversal (outer) undercut region is provided in the male and female end segments, therefore just a first undercut region for each, these are associated with one another when the fastener is in the closed condition. In contrast, if more than one transversal male and female undercut regions are provided, they are not associated with one another. For instance, in this case the first male transversal (outer) undercut region is associated with the second female transversal (outer) undercut region. There are the same number of male and female transversal (outer) undercut regions.

With respect to determining the cross-sectional width ratios as disclosed and/or claimed herein, there is a first, second, third, and fourth stage depending on the first, second, third, fourth, etc. transversal undercut regions. The first stage relates to the first transversal undercut regions of the male and female end segments, the second stage relates to the second transversal undercut regions of the male and female end segments, the third stage relates to the third transversal undercut regions of the male and female segments, the fourth stage relates to the fourth transversal undercut regions of the male and female segments, etc.

When the present disclosure addresses an inner or interiorly disposed (transversal) undercut region, this means an undercut region that is formed exclusively using the embodiments of the male and female end segments, and has neither a direct transversal nor a direct longitudinal undercut with respect to an outer wall of the fastener. In this context, transversal means that undercuts are embodied transverse to a length direction of the fastener, the term "transverse" here encompassing not only transversal undercuts that run at a right angle to the outer wall of the fastener, but also those that run at an angle with respect to the outer wall of the fastener. In this context, longitudinal means that undercuts run in the length direction of the fastener, "length direction" meaning that they may run both approximately parallel to the outer wall of the fastener and at an angle thereto. The inner undercut region also has transversal undercuts, but these are formed in recesses of the female and/or male end segment and therefore do not relate to the outer wall of the fastener.

For an interiorly disposed undercut region, it is always necessary for at least one recess to be provided in a center element, arranged in the male or female end segment, in which a complementary center element of the female or male end segment may engage. In the context of the present disclosure, more than one inner undercut region, for instance two or three undercut regions, may also be provided.

The male segment may be considered as provided with a tongue-like projection. The latter has at least one foot part and at least one head part arranged thereon, wherein the head part, in the case of the male end segment, has first and second extensions that project beyond an outer contour of the foot part. The example of the female end segment with an interiorly disposed undercut region may also be considered mushroom-shaped or the like with respect to the foot segment with a head part, or may also be considered tongue-like. However, the extension of this tongue or this mushroom head in the length direction of the fastener is at most approximately 50% of that of the tongue-like projection of the male end segment, possibly between approximately 15% and approximately 42%. The foot segment with head part, arranged approximately centrally in the female end segment, may be considered to be a projection, especially a mushroom head-shaped projection, arranged on the base of the female end segment. This projection is possibly arranged on the base with longitudinal segments of the female end segment adjacent on both sides. The projection may project over the longitudinal segments in the length direction of the fastener or may be arranged within one of these defined spaces. The mushroom head-shaped projection of the female end segment is possibly arranged or arrangable inside the male end segment in a recess of the latter when the fastener is in the closed condition. Apart from any overcuts provided in edge areas for better connection when closed, an outer contour of the mushroom head-shaped projection of the female end segment essentially corresponds to an inner contour of the male end segment. A recess in the male end segment is arranged in a center element for forming an inner undercut region, possibly in a head part arranged there. The means for forming an inner undercut region on the male end segment possibly has a foot part that carries the head part with the recess. The head part possibly projects beyond the foot part, forming two extension parts. The recess is possibly provided between them. Outer or first, second, third, fourth, etc. transversal (outer) undercut regions shall be understood in the context of the present invention to be those regions that, with respect to the male end segment, are those undercuts that are transversal or longitudinally directly relative to the outer wall of the fastener.

In the present disclosure, when an inner undercut region and at least one first outer or transversal undercut region are mentioned, undercut regions that have transversal undercuts are meant. Transversal undercuts in the context of the present disclosure are oriented transverse in any direction of the fastener apart from a length direction. They are possibly formed from linear and/or curved segments, frequently having different radii.

The inner undercut region and the at least one outer or transversal undercut region extend in the length direction of the fastener, possibly between minimum widths, relative to the specific undercut regions, of the center elements arranged in the male and female end segments. For instance, an inner undercut region of the female end segment extends proceeding from the minimum width $b_3$ of the foot segment of the female end segment to the minimum widths $b_{61}$ and $b_{62}$ of the two extension parts of the head part of the male end segment. For instance, a first outer or transversal undercut region extends approximately between a region of minimum width $b_1$ of the first foot segment that is arranged on the first base of the male end segment to approximately a minimum width $b_{21}$ and $b_{22}$ of two longitudinal segments of the complementary female end segment, arranged on both sides of a second foot segment of the female end segment that is arranged centrally on the second base.

Alternatively or additionally, the reason for the improved statically dynamic behavior is also the provision of the foot segment with the head part, which is arranged approximately in the center in the female end segment and which can be engaged in the male end segment embodied complementary thereto. A corresponding recess is provided there through which an inner undercut region is embodied in the male end segment. In addition to the inner undercut region, the male end segment has at least one outer or transversal undercut region. A female end segment in the context of the present disclosure describes such an undercut region, which receives a male end segment and is primarily lateral.

The subject matter of the present disclosure is alternatively or additionally a fastener of the type cited above, a female end segment comprising a base on which is arranged a foot segment arranged approximately centrally there, on which is arranged a head part that projects laterally over an outer contour of the foot segment transverse and, seen in a transverse direction of the fastener, comprising lower lateral surfaces for embodying at least one inner undercut region in a recess of the male end segment. Both examples of the fastener, which may also be cumulative, are improvements with regard to both static and dynamic loads compared to those from the prior art.

The disclosed fastener is possibly embodied in a ribbon-like form. It is produced in this shape and then bent to create a closed ring. In one example, therefore, the claimed fastener may be closed to create a closed ring, and especially may be embodied as a closed ring, the complementary male and female end segments being connected to one another. It may be advantageously provided that the male or female end segment may have material overcuts, especially in their respective head parts, but also in the foot part, wherein overcuts means material overcuts, so that when the ribbon-like fastener is closed to create a closed ring, deformations due to material overlays occur in these regions. Due to this, in regions in which cracks may be formed when the fastener is in use and are very highly stressed, this crack formation may be prevented so that the service life of the fastener embodied as a closed ring is extended in the fastening condition.

By bending the strip-like fastener to create a closed ring and also by crimping for fastening, for instance, a bellows with the fastener on a shaft, for instance, forge deformations and/or other deformations of the male and female end segments occur. Therefore, in the present disclosure, when reference is made to geometric values, value-related terms such as parallel, etc., or value ranges such as for instance angles or radii, these references relate to the ribbon-like fastener, that is, not to the closed fastener. The minimum widths are generally approximately retained in a closed and crimped fastener.

In the present disclosure, when the term "approximately" is used in reference to concrete values, value-related terms like parallel, etc. or ranges of values, these shall be construed to include such deviations as the person skilled in the art considers to be normal in the field of the technical expert, especially deviations of +/−10% of the specific value or term, possibly +/−5% of the specific value or value-related term.

In one example of the fastener, the widths $b_1$ or $(b_{11}+b_{12})$ and $(b_{21}+b_{22})$ together are at least 38%, possibly at least 40%, of a total width b of the fastener. The aforesaid widths are possibly approximately 38% to approximately 80%, possibly approximately 40% to approximately 75%, of the total width b of the fastener. A longitudinal force acting on the fastener can be transferred best to the center element of the male and female end segment, especially to the male foot segment, with the ratios or ranges provided above.

In another example, arranged in at least one transversal undercut region are notch radii of at least approximately 0.3 mm, possibly of at least approximately 0.5 mm, and possibly particularly in a range from approximately 0.3 mm to approximately 0.9 mm. In a further example, another notch radius of a maximum of approximately 0.3 mm is associated with a notch radius of at least approximately 0.3 mm. Particularly possible in the context of the present invention, provided in the at least one transversal undercut region are notch radii of approximately 0.4 mm to approximately 0.9 mm, and associated with these are a further notch radius of approximately 0.2 mm to approximately 0.35, possibly of approximately 0.2 mm to approximately 0.3 mm. In another example of the present invention, a notch radius is at least approximately 0.3 mm, possibly at least 0.5 mm, and possibly in a range from approximately 0.4 mm to approximately 0.85 mm in the transition from the first base of the male end segment to the foot segment. Here, as well, different radii may possibly be used, as described in the foregoing.

Notch radii of at least approximately 0.3 mm, possibly at least approximately 0.5 mm, and more possibly particularly in a range from approximately 0.3 mm to approximately 0.9 mm are arranged in the region between lateral longitudinal surfaces of the foot segment and lateral transverse surfaces of the extension parts of the male end segment. It may advantageously be provided that different radii are used, wherein in the region of the minimum width $b_1$ of the foot segment of the male end segment greater notch radii in a range from approximately 0.7 mm to approximately 0.9 mm are advantageously provided, to which are connected minimum radii in a range of approximately 0.25 mm to approximately 0.5 mm, possibly in a range from approximately 0.3 mm to approximately 0.4 mm.

In one particularly example of the present invention, provided in the region of minimum widths of the first, second, third, fourth, etc. transversal undercut regions or innerly disposed transversal undercut regions are the greatest possible notch radii, in particular those in a range from approximately 0.5 mm to approximately 0.9 mm, particularly possibly those in a range from approximately 0.6 mm to approximately 0.9 mm, to which are connected minimum notch radii in a range of approximately 0.2 mm to approximately 0.35 mm. This advantageously suppresses the static or dynamic load-related widening of cracks and the like in the undercut regions of the inventive fastener that are critical for load transfer.

The first foot segment on the first base of the male end segment possibly has a greater width $b_4$ than the first minimum width $b_1$. It is furthermore possible that a transition angle γ (gamma) is between the first base and the first foot segment of the male end segment in a range from approximately 90.5° to approximately 110°, possibly in a range from approximately 91° to approximately 102°. Using this specific example of the first foot segment of the male end segment it is advantageously possible to realize the greatest possible notch radii in critical regions, especially in regions of minimum widths $b_1$.

Possibly provided at the first base of the male end segment are at least two lengthening segments that may be arranged in complementary recesses of the female end segment. These lengthening segments thus provide additional transversal undercut regions, which permits improved meshing of the female end segment with the male end segment.

Lateral surfaces formed by the first foot segment of the male end segment are advantageously embodied at an acute angle to lateral transverse surfaces embodied in the first male transversal undercut region by first and second extension parts.

The extension parts comprise lateral transverse surfaces for embodying the at least one outer transversal undercut region. The lateral transverse surfaces, with lateral longitudinal surfaces of the foot segment of the male end segment, form an acute angle W in a range from approximately 45° to approximately 88°, possibly in a range from approximately 68° to approximately 88°, possibly in a range from approximately 75° to approximately 86°. Possibly, the acute angle W is 80°+5°, which means that an acute angle W of 80° is possible, but it may have a production tolerance of +5°.

The minimum widths $b_{21}$ and $b_{22}$ of both outer longitudinal segments and the minimum width $b_3$ of the second foot segment of the female end segment, when present, are selected such that they have a ratio $b_1:(b_{21}+b_{22}+b_3)$ or $(b_{11}+b_{12}):(b_{21}+b_{22}+b_3)$ of approximately 0.79 to approximately 1.27, possibly approximately 0.85 to approximately 1.18, more possibly approximately 0.95 to approximately 1.05 to the minimum width $b_1$ of the foot segment of the male end segment or to the minimum widths $b_{11}$ and $b_{12}$ of the longitudinal segments in the region of the recess. This ratio has proved to be essential during the calculation by means of finite element analysis for supplying the best figures for tensile stresses that occur. In principle the ratios of the minimum widths (cross-section width ratios) of the male and female end segments are formed systematically at a first male and a first female stage, or at a second male and second female stage, or at a third male and third female stage, etc., relative to such outer transversal undercut regions, and are possibly in the aforesaid regions in the context of the present disclosure.

It is particularly possible that a width $b_5$ of the first base or of the lengthening segments that are provided on the first base of the male end segment is at least 1.0 mm, the width $b_5$ is possibly in a range from approximately 1.2 mm to approximately 2.0 mm, if lengthening segments are provided, wherein the width $b_5$ of the first base then possibly essentially equals the width of the lengthening segments. If no lengthening segments are provided, the width $b_5$ of the first base is possibly between approximately 1.5 mm and approximately 3.2 mm.

In a finite element analysis, it was shown that the fastener has excellent values not only for static tensile elongation, but also for dynamic tensile-bending strain. In addition, finite element methods demonstrated that the inventive fastener yield very good values for a static crack opening, determined in an intermediate stress step during the assembly of the binder. For all of the aforesaid variables that are determined normalized using finite element methods, values less than 100%, and possibly less than 80%, could be determined. This means that only extremely small crack openings will occur in use or during post-production delivery of the closed, ring-shaped fastener. The values for dynamic tensile-bending strain are in particular <=100 possibly at a maximum of approximately 80%, possibly a maximum of approximately 75%, possibly in a range from approximately 20% to approximately 80%, and thus are values that are clearly below those values for puzzle connections according to the prior art, likewise determined by finite element methods and normalized, the values of which are often significantly greater than 100%.

In one example, the second foot segment of the female end segment, when present, is embodied proceeding from the base thereof tapering to a minimum width $b_3$. Furthermore, in this example a transition angle $\beta$ between base and second foot segment is in a range from approximately 91° to approximately 110°, possibly in a range from approximately 93° to approximately 108°. Furthermore, arranged between lateral surfaces of the second foot segment and the lower lateral surfaces of the head part of the female end segment there can be radial regions having notch radii of at least approximately 0.3 mm, further possible are notch radii of at least approximately 0.5 mm, and yet further possible are notch radii in a range from approximately 0.3 mm to approximately 0.9 mm. It is possible that different notch radii are provided in the aforesaid radial ranges. Particularly possible in the range of minimum widths, such as for instance the minimum width of the second foot segment of the female end segment, are radii of approximately 0.7 mm to approximately 0.9 mm, possibly approximately 0.8 mm to approximately 0.9 mm, to which then a minimum radius in a range from approximately 0.3 mm to approximately 0.4 mm can connect. The aforesaid minimum radii, which are possibly in a range from approximately 0.25 mm to approximately 0.5 mm, possibly in a range from approximately 0.3 mm to approximately 0.4 mm, serve to make available the most possible functions such as undercuts or load-bearing cross-sectional surfaces of the inventive fastener on the available narrow space. A normal width b of a fastener is in a range from approximately 8 mm to approximately 20 mm, possibly approximately 9 mm to approximately 13 mm. However, these minimum radii are not used in the region of the minimum widths, because otherwise strong notch effects would occur there. Only when there is at least a 0.1 mm enlargement of the cross-section due to a larger radius, in particular a radius in a range from approximately 0.7 mm to approximately 0.9 mm, should a minimum radius be provided connecting thereto. In the region of a critical cross-section, that is, a minimum cut or width of the male or female end segment, for instance a minimum width of the foot segments, possibly the largest possible notch radii are used in a range from approximately 0.4 mm to approximately 1 mm, possibly to approximately 0.9 mm. The transition from a minimum radius to a larger radius or vice versa is always tangentially continuous. The aforesaid local radii of curvature are advantageously determined by comparing different known conforming radii.

At least parts of, possibly all, the lateral surfaces of the head part of the female end segment, when present, are advantageously embodied curved with notch radii of at least approximately 0.3 mm, possibly of at least approximately 0.5 mm, more possibly with notch radii in a range from approximately 0.3 mm to approximately 0.9 mm. In this case, as well, different radii may connect to one another, as described in the foregoing. One lateral head surface of the head part is embodied in at least one sub-region approximately parallel to the base of the female end segment. It is particularly possible that the radial regions of the lateral surfaces of the head part transition, with notch radii of at least approximately 0.5 mm, possibly at least approximately 0.7 mm, particularly possibly in a range of approximately 0.7 mm to approximately 0.9 mm, into the lateral head surface of the head part. A linear region without any curvature may be provided following the radial region.

In one example, an outer longitudinal segment whose outer wall transitions flush into the outer wall of the fastener is arranged on both sides of the foot segment of the female end segment. In their ends that are associated with the male end segment, the longitudinal segments may have recesses in which lengthening segments of the male end segment may be arranged. This provides additional longitudinal undercuts that further prevent the risk of a connection between male and female end segments in a closed inventive fastener from being opened if there is a bending stress.

In a first embodiment, the two outer longitudinal segments project beyond the head part of the female end segment in a length direction of the fastener. In a second embodiment, as seen in a length direction of the fastener, the head part of the female end segment projects beyond the outer longitudinal segments, or projects out beyond the ends of the outer longitudinal segments. In the second embodiment, therefore, the male end segment has a recess embodied beyond the base thereof as seen in the length direction of the strip, in which recess the foot part engages with the head part of the complementary female end segment.

In one example of the inventive fastener, in addition to the at least one outer transversal undercut region, the male end segment includes at least one inner undercut region. It may also be provided that at least two or three or even more transversal undercut regions are provided, but possibly one or two or three transversal undercut regions are provided.

In another example, arranged on the end of the foot segment of the male end segment facing away from the base is a head part with extension parts that embody the inner undercut region, in particular in that they form a recess for foot part with head part of a female end segment.

Lateral surfaces of the extension parts are advantageously approximately parallel to the outer wall of the fastener. However, it may also be provided that the lateral surfaces are slightly angled to the outer wall of the fastener, i.e., especially advantageously the head part of the male end segment as seen in the long direction of the fastener tapers somewhat. The deviations from a parallel orientation are possibly in a range from approximately +/−10°, more possibly in a range from approximately +/−5°. The lateral surfaces of the extension parts may be not only linear, which is preferred, but also in another manner, in particular they may have bent regions that form bulges or indentations in the extension parts of the head part of the male end segment. The transition between the lateral surfaces of the extension parts of the head part of the male end segment and the particular lateral head surfaces thereof, which may be associated with the base of the female end segment, is possibly at a right angle. For technical production reasons, however, minimum notch radii may be up to 0.3 mm. This cannot be avoided for technical production reasons.

Furthermore, between the extension parts is a recess that is complementary to the foot segment with head part, when present, arranged on the base of the female end segment. The recess may be described as approximately mushroom head-shaped. Because of this, the center elements that are arranged in the male end segment and that comprise foot part and head part with the two extension parts and the recess, are shaped something like a stag beetle. When more than one inner undercut region is provided, tree-like contours may then be added, for instance.

In another example, a length l of the foot segment and of the head part with the extension parts of the male end segment is shorter than a width b of the fastener. The length l is possibly approximately 70% to approximately 98%, more possibly approximately 78% to approximately 95%, of the width b of the fastener.

The present disclosure further relates to the use of the fastener for fastening bellows on joint housings, in particular on outer joint housing parts and/or shafts, especially of automobiles, especially of constant velocity joints. From bellows and a fastener a system is formed that makes it possible to fasten bellows. In particular, this system has a pleated bellows and/or a roller bellows.

SUMMARY OF THE DRAWINGS

The foregoing and other advantages of the present fastener are explained in greater detail using the following figures.

DETAILED DESCRIPTION

It should first be noted that the examples of the fastener depicted in the figures should not be interpreted as limiting; for instance, two or more foot segments with head part and extension parts may also be arranged at the base of the female and male end segments in the case of the male end segment. The features described in the figures may be combined to create another embodiment with the features provided in the description above. Moreover, it should be noted that the reference numbers indicated in the description of the figures do not limit the scope of protection for the present invention, but instead merely refer to the exemplary embodiments illustrated in the figures. Provided no information to the contrary is explicitly provided, identical parts or part with the same function have the same reference numbers in the following.

Figure 1:
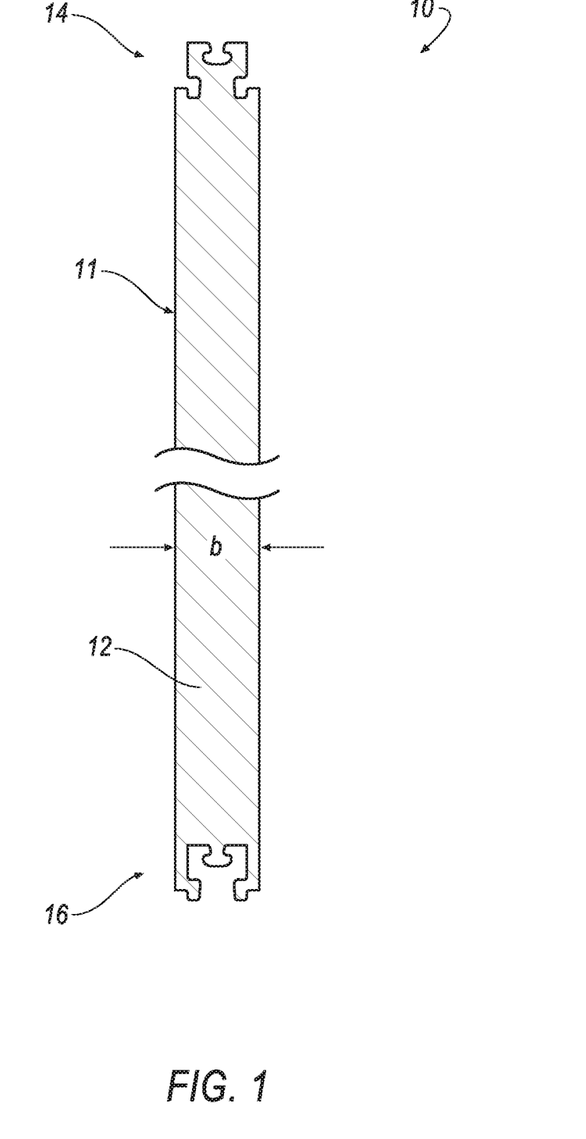
FIG. 1 is a top view onto a ribbon-like inventive fastener in a first example.

FIG. 1 is a top view onto a first example of a fastener 10, which is shown in a ribbon-like shape, i.e., in the non-closed condition. The fastener 10 has a male end segment 14 and a female end segment 16 between which a strip segment 12 is arranged. The fastener 10 has an outer wall 11 on both sides.

Figure 2A:
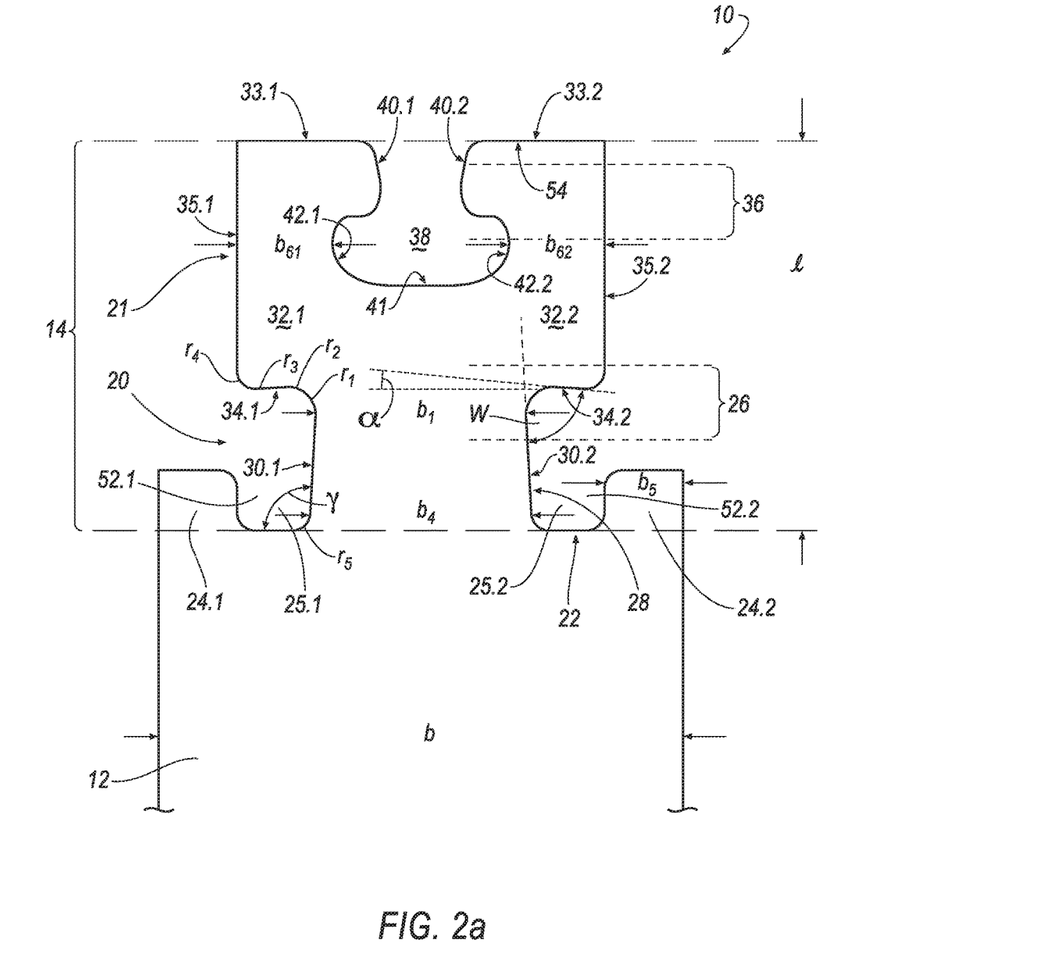
FIG. 2A is a male end segment of the fastener according to FIG. 1.

FIG. 2A depicts a first embodiment of the male end segment 14 of the fastener 10 according to FIG. 1. A width b, determined between the outer walls 11, of the fastener 10 or strip segment 12, is greater than a length l of the male end segment, measured between a base 22 and lateral head surfaces 33.1 and 33.2. The length l is approximately 80% of the width b.

The male end segment 14 has a foot segment 20 and a head part 21. The head part 21 has two extension parts 32.1 and 32.2 that project laterally beyond an outer contour of the foot part 20. The foot part 20 has lateral longitudinal surfaces 30.1, 30.2, an obtuse angle γ (gamma), approximately 93°, being formed between the base 22 and the lateral longitudinal surfaces 30.1 and 30.2. A notch radius $r_5$ of approximately 0.3 mm is provided in the region of the transition from the base 22 to the lateral longitudinal surfaces 30.1 and 30.2. The foot part 20 is embodied tapering to a minimum width $b_1$. Provided following this minimum width $b_1$ is a first notch radius $r_1$, having a value of 0.8 mm, which transitions continuously tangentially into a notch radius $r_2$ of 0.3 mm. These notch radii $r_1$ and $r_2$ represent the transition from the lateral longitudinal surfaces 30.1 and 30.2 of the foot segment 20 to lateral transverse surfaces 34.1 and 34.2 of the extension parts 32.1 and 32.2, which lateral transverse surfaces 34.1 and 34.2 are arranged in a first and only outer undercut region 26. These then transition into lateral surfaces 35.1 and 35.2 of the extension parts 32.1 and 32.2 with a minimum notch radius $r_3$ of 0.3 mm and connecting thereto continuously tangentially with a notch radius $r_4$ of 0.8 mm. The lateral surfaces 35.1 and 35.2 are not embodied running parallel to the outer wall 11 of the fastener 10, but instead at an angle of approximately 3° thereto, so that the extension parts 32.1 and 32.2 are embodied somewhat tapering toward the lateral head surfaces 33.1 and 33.2 thereof that can be associated with the female end segment 16. This provides a region, following the notch radius $r_4$, having a minimum width $b_2$ in the complementary female segment 16, as may be seen below in FIG. 2b. In the male end segment 14, the foot segment 20 has a greater width $b_4$ on the base 22 than in the region of the minimum width $b_1$.

The transition between the lateral longitudinal surfaces 35.1 and 35.2 of the extension parts 32.1 and 32.2 into the lateral head surfaces 33.1 and 33.2 runs essentially at a right angle.

Due to production tolerances, however, notch radii may be up to 0.3 mm.

The lateral transverse surfaces 34.1 and 34.2 of the extension parts 32.1 and 32.2 are embodied at an acute angle W of 85° with the lateral longitudinal surfaces 30.1 and 30.2 of the foot segment 20.

The head part 21 of the male end segment 14 has a mushroom head-shaped recess 38 that is for forming an inner undercut region 36 and that is embodied proceeding from the lateral head surfaces 33.1 and 33.2 of the extension parts 32.1 and 32.2. The lateral head surfaces 33.1 and 33.2 transition to inner lateral longitudinal surfaces 40.1 and 40.2 for forming a sort of mushroom stem for the mushroom head-shaped recess 38. The mushroom head of the mushroom head-shaped recess 38 has a lateral base surface 41, some of which is linear and parallel to the base 22 and transitions into curved inner lateral surfaces 42.1 and 42.2 without any linear segments so that ultimately a mushroom head is formed. Minimum widths $b_{61}$ and $b_{62}$ of the extension parts 32.1 and 32.2 may be found in the region of the mushroom head-shaped recess 38.

Figure 2B:
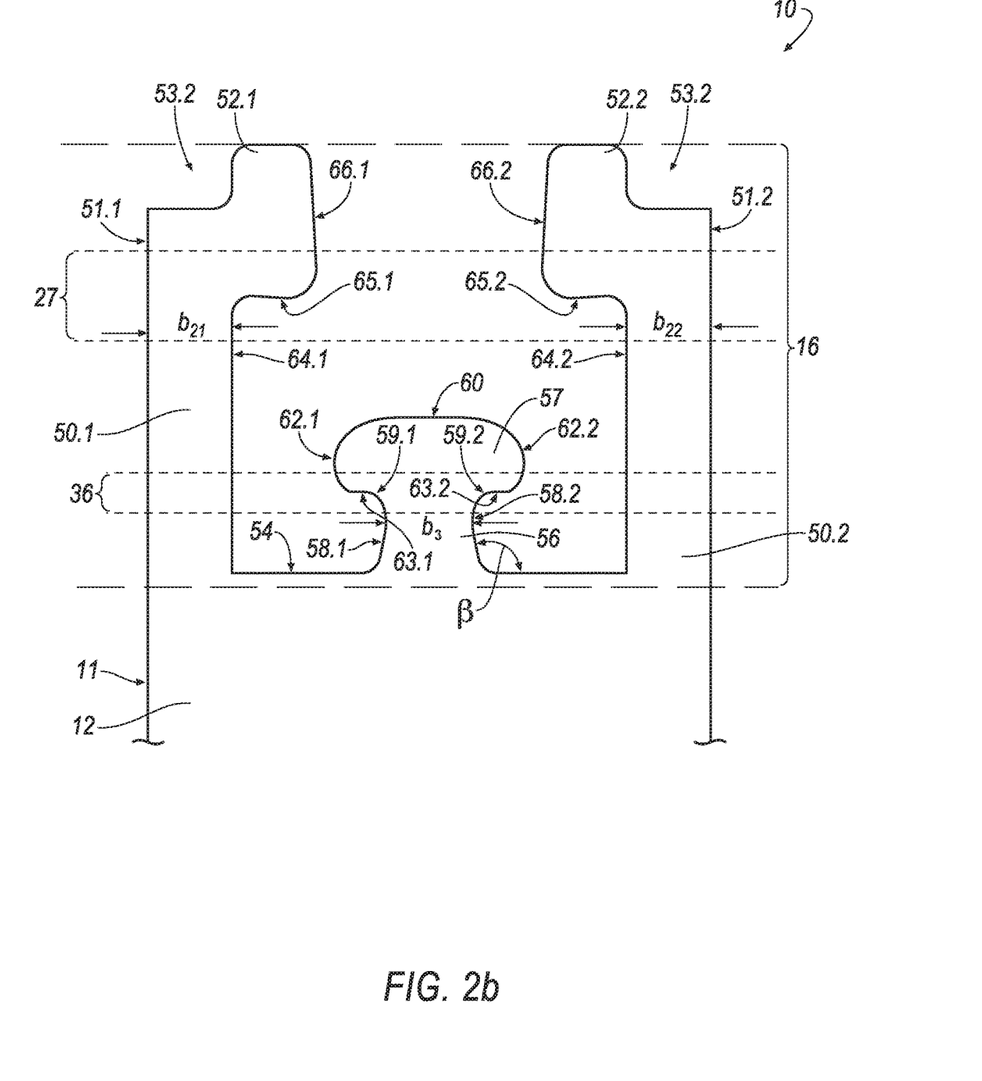
FIG. 2B is a female end segment of the fastener according to FIG. 1.

FIG. 2b depicts the female end segment 16 of the fastener 10 in which are shown the first and only outer transversal undercut region 27, also cited with respect to the complementary embodiment to the male end segment 14, and the innerly disposed transversal undercut region 36. The first transversal undercut regions 26 and 27 extend from the minimum width $b_1$ of the foot segment 20 of the male end segment 14 to the minimum width $b_{21}$ or $b_{22}$ of longitudinal segments 50.1 and 50.2 of the female end segment 16. The innerly disposed transversal undercut region 36 extends from a minimum width $b_3$ of a foot segment 56 of the female end segment 16 to the minimum widths $b_{61}$ and $b_{62}$ of the extension parts 32.1 and 32.2 of the male end segment 14. Proceeding from a base 54 of the end segment 16, a foot segment 56 with a head segment 57 is arranged approximately in the center. The foot segment 56 has a minimum width $b_3$. Lateral longitudinal surfaces 58.1 and 58.2 of the length segment 56 transition from an obtuse angle β of approximately 95° into the base 54. The foot segment 56 is thus embodied tapering towards the head part 57. Connecting to the lateral longitudinal surfaces 58.1 and 58.2 of the length segment are lower lateral transverse surfaces 63.1 and 63.2 that are embodied at least in part parallel to the base 54 and transition to curved lateral surfaces 62.1 and 62.2, which themselves transition to a lateral head surface 60 that is embodied with a center sub-region approximately parallel to the base 54. In the transition between the lateral longitudinal surfaces 58.1 and 58.2 of the foot segment 56 and the lower lateral transverse surfaces 63.1 and 63.2, radial regions 59.1 and 59.2 immediately following the minimum width $b_3$ have a notch radius of 0.8 mm and then tangentially continuously a notch radius of 0.3 mm.

Length segments 50.1 and 50.2, whose outer walls 51.1 and 51.2 transition flush into the outer wall 11 of the fastener 10, are embodied on both sides of the mushroom head-shaped center formed by the foot segment 56 and the head part 57. At its end that may be associated with the male end segment, the length segments 50.1 and 50.2 have recesses 53.1 and 53.2 in which extension segments 24.1 and 24.2 (see FIG. 2A) of the male end segment 14 may engage. This provides a longitudinal undercut 28 (see FIG. 2A). Projections 52.1 and 52.2 of the length segments 50.1 and 50.2, associated with the male end segment 14, come to be positioned therein in recesses 25.1 and 25.2 (see FIG. 2A).

The length segments 50.1 and 50.2 have minimum widths $b_{21}$ and $b_{22}$. These minimum widths $b_{21}$ and $b_{22}$ follow second inner lateral transverse surfaces 65.1 and 65.2 within the undercut region 27 and are in the transition to the second inner lateral longitudinal surfaces 64.1 and 64.2, wherein immediately connected to the minimum widths $b_{21}$ and $b_{22}$ is a notch radius of 0.8 mm and provided connected therein is a notch radius of 0.3 mm. The second inner lateral transverse surfaces 65.1 and 65.2 then transition into the first inner lateral transverse surfaces 66.1 and 66.2.

The ratio of the widths $b_1:(b_{21}+b_{22}+b_3)$ is approximately 0.87. With such a ratio, the minimum cross-sectional width of the male end segment 14 and the minimum cross-sectional widths of the female end segment 16 optimize the values for tensile stresses in the fastener once it has been closed to create a ring.

The outer first undercut region 26 of the male end segment 14 comprises the lateral transverse surfaces 34.1 and 34.2 with connecting radial regions. According to FIG. 2B, the inner undercut region 36 is formed by the lower lateral transverse surfaces 63.1 and 63.2 and the radial regions connected thereto.

Figure 3:
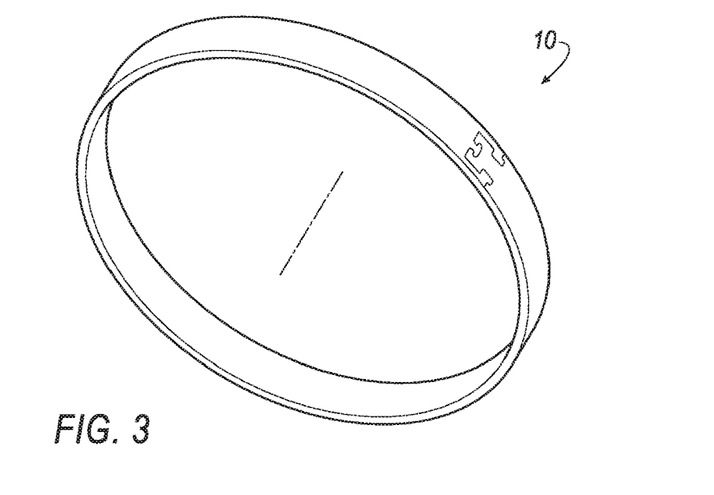
FIG. 3 is a perspective elevation of the fastener according to FIGS. 1 through 3 in the closed ring condition.
Figure 4:
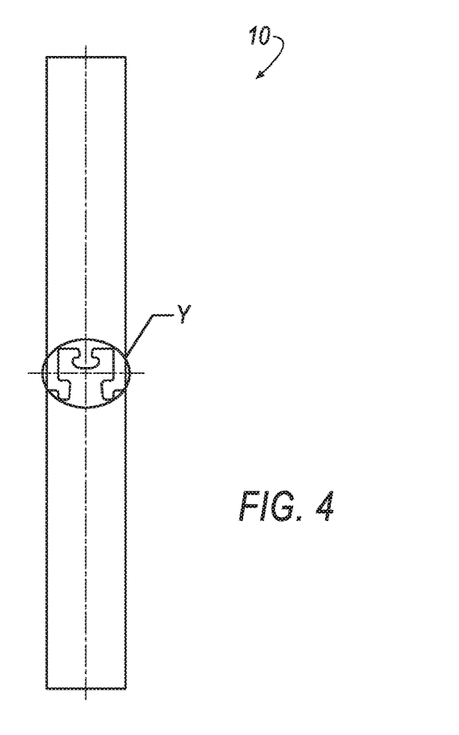
FIG. 4 is a top view onto a second example of a closed ring-shaped fastener.
Figure 12:
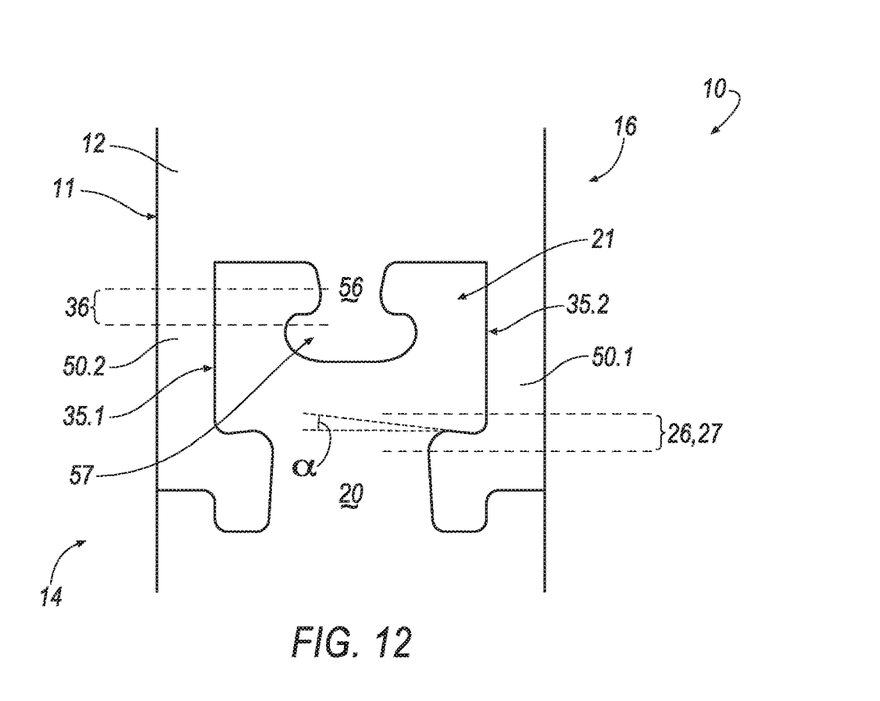

FIG. 3 is a perspective elevation of the first example of the fastener 10, shaped as a closed ring. In contrast, FIG. 4 is a top view onto a closed ring in a second example of the fastener 10, the detail Y being shown in FIG. 6. This second example is essentially similar to the first example according to FIGS. 1 through 3, but the lateral longitudinal surfaces 35.1 and 35.2 of the extension parts 32.1 and 32.2 of the head part 21 are oriented exactly parallel to an outer wall 11 of the fastener 10. In addition, an angle α, which is determined by the lateral transverse surfaces 34.1 and 34.2 and their linear segments on the one hand and, on the other hand, by a straight line running through the base 22 of the male end segment 14 or a parallel thereto, is 10° and not 5°, as in the example according to FIG. 2A. Consequently, in this example the value for the acute angle W, which is not shown in FIG. 12, is approximately 80°, since the angle γ, which is also not shown in FIG. 12, is 93°, just as in the first example according to FIG. 2A. However, the acute angle W may also be, for instance, 70° in an alternative to the example according to FIG. 12. FIG. 12 provides an idealized view of the union of the male end segment 14 and the female end segment 16 on the fastener 10 that has been closed to create a ring. In fact, due to the use of bending tools there may be minor material deformations, however, so that the precise geometrical values, that is, the precise shape of the male and female end segments 14, 16 in the closed ring, deviate somewhat from those of the open ribbon segment as shown in FIGS. 1 and 2a/b.

Figure 5:
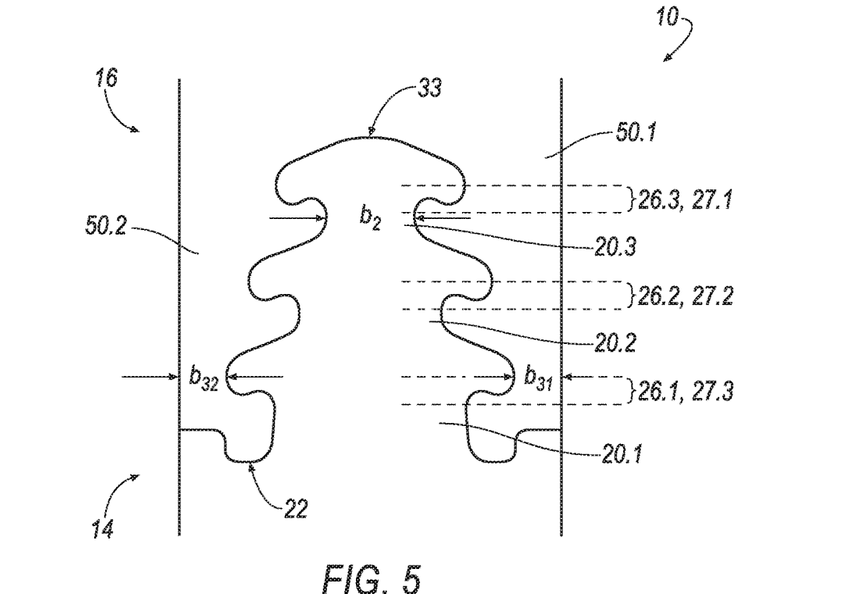
FIG. 5 is a third example of a closed fastener.
Figure 7:
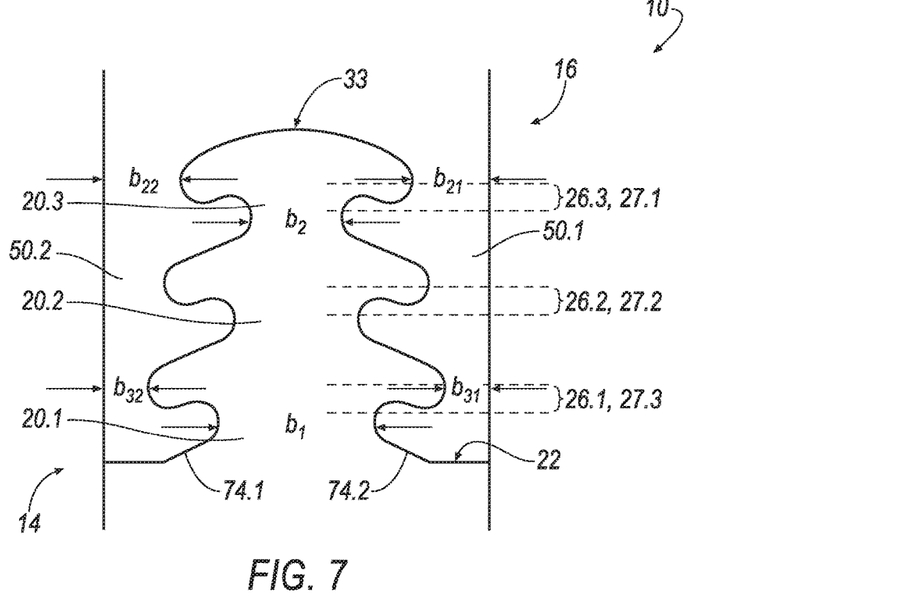
FIG. 7 is a fifth example of a closed fastener.

FIG. 5 depicts a third example of the inventive fastener 10 that has three stages of outer transversal undercut regions, wherein FIG. 7 illustrates a similarly embodied fifth example in the region of a first base 22 of a male end segment 1.4, the third example is similar to the male end segment 14 according to FIG. 2a. A base 22 of the fifth example according to FIG. 7 is different from that of the third example in that there a material accumulation 74.1 and 74.2 is provided to a first male foot segment 20.1, which material accumulation is more or less linearly increasing proceeding from the base 22 so that chamfering is formed. In the region of a first base 22 of a male end segment 14, the third example is similar to the male end segment 14 according to FIG. 2A. The third example has in particular a first transversal undercut region 26.1, a second transversal undercut region, 26.2, and a third transversal undercut region 26.3 of the male end segment 14, as well as a first transversal undercut region 27.1, a second transversal undercut region 27.2, and a third transversal undercut region 27.3 of the female end segment 16. The third example, depicted in FIG. 5, may be considered as (fir) tree-like. The cross-sectional width ratio of the first stage is calculated from the minimum width b1 of the first male foot segment 20.1 and the minimum widths $b_{21}$ and $b_{22}$ of the extension segments 50.1 and 50.2 of the female end segment 16 (see also FIG. 7). It is approximately 1, and is likewise for the fifth embodiment according to FIG. 7. The cross-sectional width ratio of the third stage, with respect to the third outer transversal undercut of the male end segment 14 and of the female end segment 16, is calculated from the width $b_2$ of a third male foot segment 20.3 of the male end segment 14 and minimum widths $b_{31}$ and $b_{32}$ of the retention parts 50.1 and 50.2 of the female end segment 16 ($b_2:(b_{31}+b_{32})$). It is approximately 0.93, and is likewise for the fifth example according to FIG. 7.

Figure 6:
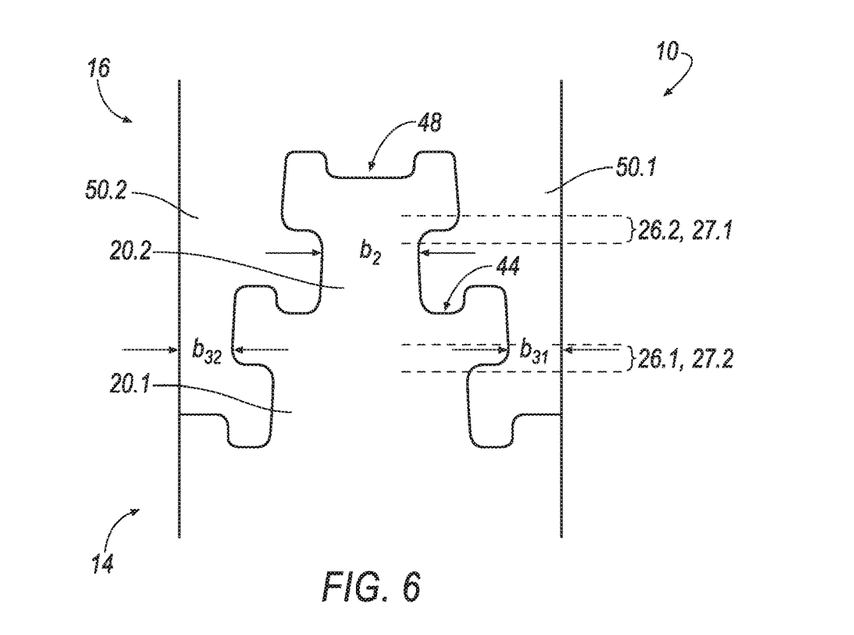
FIG. 6 is a fourth example of a closed fastener.

FIG. 6 depicts a fourth example of an inventive fastener 10 that is the same as the sixth example according to FIG. 8 (see below, as well) apart from an inner undercut region 36. This fourth example has a two-stage embodiment with transversal outer undercut regions 26.1 and 26.2 or 27.1 and 27.2. A first transversal undercut region 26.1 of a male end segment 14 and a second transversal undercut region 27.2 of the female end segment 16 are provided, as is a first transversal undercut region 27.1 of a female end segment 16 and a second transversal undercut region 27.2 of the female end segment 16. A cross-sectional width ratio on the second stage, calculated from a minimum width $b_2$ of a second male foot segment 20.2 and widths $b_{31}$ and $b_{32}$ from longitudinal segments 50.1 and 50.2 of the female end segment 16 in the region of the second transversal undercut 27.1 is approximately 1. A trough-like recess 48 is arranged in the male end segment 14 in the second head part.

Figure 8:
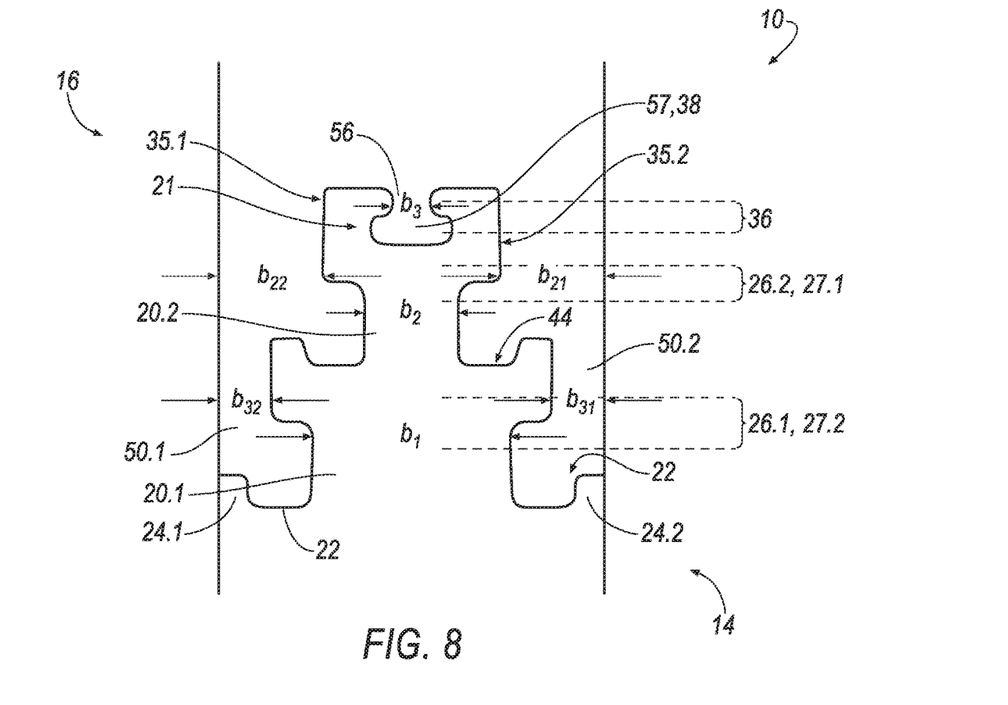
FIG. 8 is a sixth example of a closed fastener.

FIG. 8 depicts a sixth example of the inventive fastener 10 in the closed ring-shaped condition. In this example, two outer transversal undercut regions 26.1 and 26.2 of a male end segment 14 and two outer transversal undercut regions 27.1 and 27.2 of the female end segment 16 are provided. The shape of the male end segment 14 may be considered to be tree-like. The minimum width $b_2$ of a second male foot segment 20.2 in the second undercut region 26.2 is therefore used to determine for the ratio of the second stage ($b_2:(b_{31}+b_{32})$), which is approximately 0.8, while for determining the cross-sectional width ratio on the first stage, a minimum width $b_1$ of a first male foot segment 20.1 in the first undercut region 26.1 is used and widths $b_{21}$ and $b_{22}$ of the outer lateral longitudinal segments 50.1 and 50.2 of the female end segment 16 in the undercut region 27.1 are used, as well as a minimum width $b_3$ of the inner undercut region 36, and the ratio there $b_1:(b_{21}+b_{22}+b_3)$ is approximately 0.8. Because two outer undercut regions 26.1 and 26.2 are provided, the sixth example according to FIG. 8 has excellent values for static tensile elongation. Following the first undercut region 26.1, then, a longitudinal undercut region is again provided due to the trough-like formation 44, as is provided by the projections 24.1 and 24.2 in the first example according to FIG. 2a, for instance. In addition, however, corresponding projections 24.1 and 24.2 are also provided on the base 22. Otherwise the upper part with the recess 38 is identical to the second example according to FIGS. 4 and 12. If there was a desire to provide two inner undercut regions, in a tree-like manner a recess 38 would be provided in the adjacent segment or a foot 20.1 would also be provided.

Figure 9:
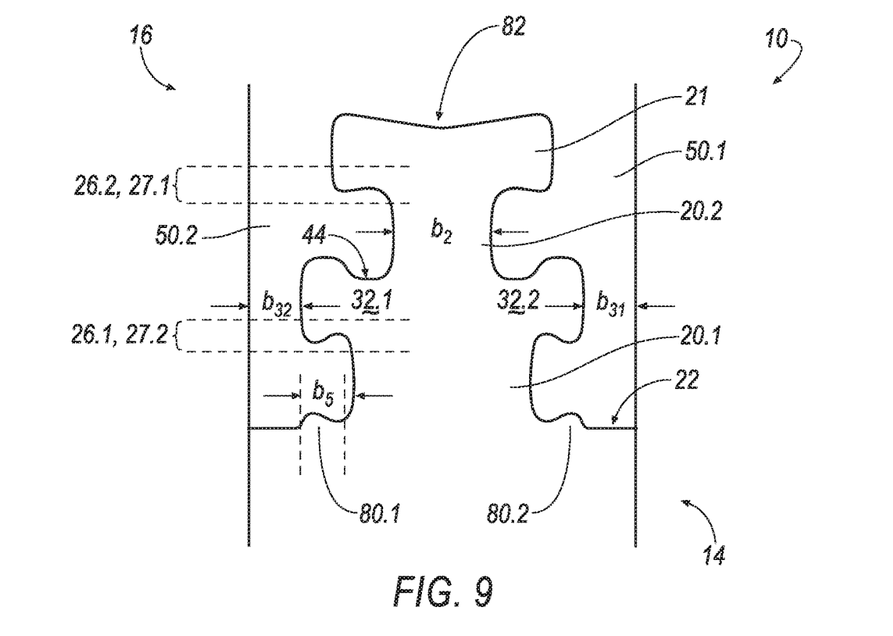
FIG. 9 is a seventh example of a closed fastener.

FIG. 9 depicts a seventh example of the inventive fastener 10 that has first transversal undercut regions 26.1 and second transversal undercut regions 26.2 of the male end segment 14 and first transversal undercut regions 27.1 and second transversal undercut regions 27.2 of the female end segment 16. On the second stage the cross-sectional width ratio, determined from a minimum width $b_2$ of a second male foot segment 20.1 and minimum widths $b_{31}$ and $b_{32}$ of longitudinal segments 50.1 and 50.2 of the female end segment 16, is approximately 1, for the first stage the cross-sectional width ratio is approximately 0.91. The seventh example according to FIG. 9 has additional trough-like recesses 44 following the extension parts 32.1 and 32.2 and facing the second male foot segment 20.2, though which is provided additional longitudinal undercuts and further improved meshing of the female end segment 16 with the male end segment 14. The second head region of the male end segment 14 has a depression 82, and at the base of this segment are arranged lengthening segments 80.1 and 80.2 in the form of small projections having a primarily curved outer contour that has a width $b_5$ of approximately 1.5 mm. These further improve meshing and make additional undercuts available.

Figure 10:
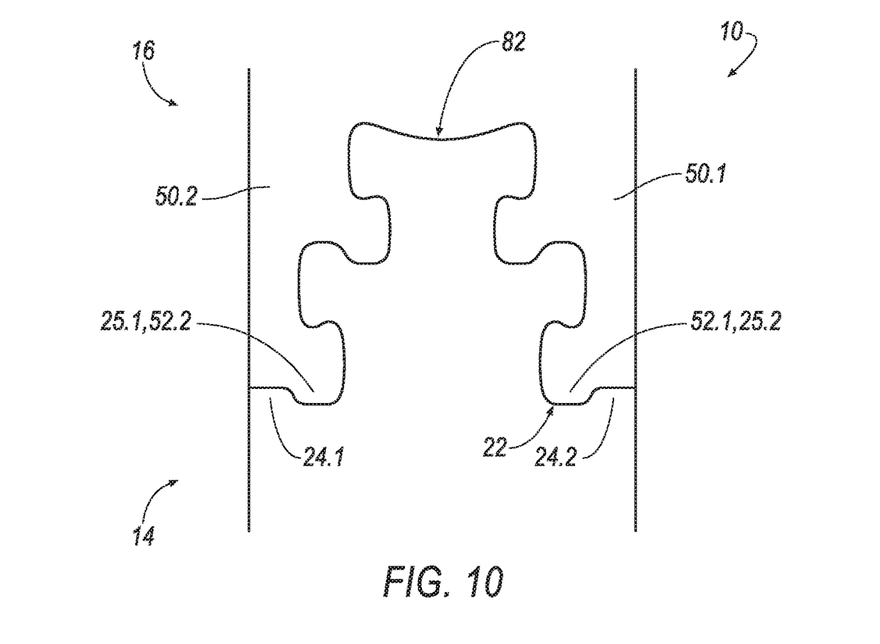
FIG. 10 is an eighth example of a closed fastener.

FIG. 10 depicts an eighth example of a fastener 10 similar to that shown in FIG. 9. In particular the cross-sectional width ratios of the eighth example correspond to those of the seventh example according to FIG. 9. However, the eighth example is different in the region of the first base 22 of the male end segment 14. Similar to the first example according to FIG. 2A, provided in the male end segment 14 are lengthening segments 24.1 and 24.2 into which projections 52.1 and 52.2 of the longitudinal segments 50.1 and 50.2 of the female end segment 16 engage.

Figure 11:
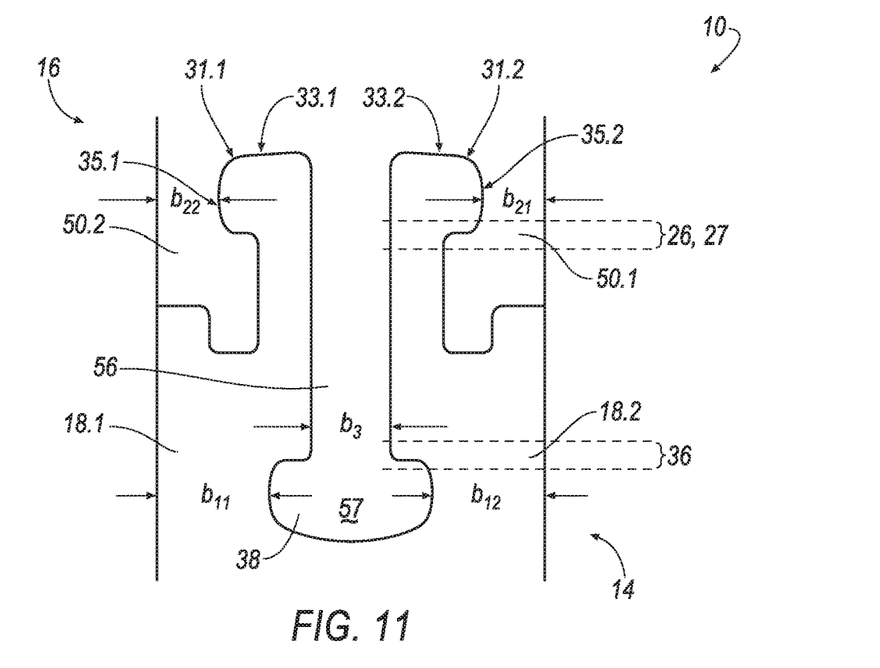
FIG. 11 is a ninth example of a closed fastener; and,
FIG. 12 is a detail Y from FIG. 4.

FIG. 11 depicts a ninth example of the fastener 10 when closed, i.e., with male and female end segments, this example differing from, e.g., the first and second embodiments primarily in that the foot segment 56 of the female end segment 16 has been lengthened significantly, specifically beyond the base 22 of the male end segment 14 in the length direction of the fastener 10. Because of this, the head part 57 is disposed on the far side of the base 22 so that then, ultimately, embodied in the male end segment 14 is a recess 38 that is displaced beyond the base 22 in the length direction of the fastener. In the embodiment according to FIG. 11, the minimum width $b_1$ is formed by the two sub-widths $b_{11}$ and $b_{12}$, so that there is a ratio ($b_{11}+b_{12}$): ($b_{21}+b_{22}+b_3$) of 0.8. The widths $b_{11}$ and $b_{12}$ of the male end segment 14 then relate to the longitudinal segments 18.1 and 18.2 thereof, which were created due to the displacement of the recess 38 beyond the first base 22 in the length direction of the fastener.

With the disclosed fastener, a fastener is provided that supplies better values in terms of tensile and bending load, so that ultimately crack openings are prevented during operation and the service life of the inventive fastener is thereby significantly extended.

The invention claimed is:
1. A fastener for bellows, comprising:
  a male end segment and a female end segment complementary to the male end segment, each having at least one first transversal undercut region;
  wherein a first width $b_1$ of the male end segment is determined by the minimum width of a first foot segment extending away from a first base in the first male transversal undercut region; and wherein the female end segment has first and second outer longitudinal segments that have respective second minimum widths $b_{21}$ and $b_{22}$ in the region of the first female transversal undercut region;

wherein, when the female end segment has an innerly disposed transversal undercut region with a second foot segment and the second foot segment extends away from a second base, the second foot segment has a third minimum width $b_3$ in the innerly disposed transversal undercut region;

wherein, when the female end segment does not have an innerly disposed transversal undercut region with a second foot segment, the third minimum width $b_3$ equals zero; and wherein $b_1:(b_{21}+b_{22}+b_3)$ is in a range from approximately 0.85 to approximately 1.27.

2. The fastener of claim 1, wherein the widths $b_1$ and $(b_{21}+b_{22})$ together are at least 38% of a total width b of the fastener.

3. The fastener of claim 1, wherein arranged in at least one transversal undercut region are notch radii of at least approximately 0.3 mm.

4. The fastener of claim 3, wherein an additional notch radius of a maximum of approximately 0.3 mm is associated with one of the notch radii of at least approximately 0.3 mm.

5. The fastener of claim 1, wherein a notch radius in the transition from the first base of the male end segment to the foot segment is at least approximately 0.3 mm.

6. The fastener of claim 1, wherein the first foot segment on the first base has a greater width $b_4$ than the first width $b_1$.

7. The fastener of claim 1, wherein provided at the first base of the male end segment are at least two lengthening segments that may be arranged in complementary recesses of the female end segment.

8. The fastener of claim 1, wherein lateral surfaces formed by the first foot segment are embodied at an acute angle W to lateral transverse surfaces embodied in the first male transversal undercut region by first and second extension parts.

9. The fastener of claim 1, wherein a length l of the ma female end segments is shorter than a total width b of the fastener.

10. The fastener of claim 1, wherein the fastener is ribbon-like.

11. The fastener of claim 1, wherein the fastener may be closed to create a ring in which the male and the female end segments are connected to one another.

12. The fastener of claim 7, wherein a width $b_5$ of the first base or of the lengthening segments is at least 1.0 mm.

13. The fastener of claim 1, wherein the fastener has a value for the dynamic tensile-bending strain, determined by dynamic alternating load, of <=100%.

14. A system, comprising:
a bellows; and
a fastener comprising a male end segment and a female end segment complementary to the male end segment, each having at least one first transversal undercut region;

wherein a first width $b_1$ of the male end segment is determined by the minimum width of a first foot segment extending away from a first base in the first male transversal undercut the region; and wherein the female end segment has first and second outer longitudinal segments that have respective second minimum widths $b_{21}$ and $b_{22}$ in the region of the first female transversal undercut region;

wherein, when the female end segment has an innerly disposed transversal undercut region with a second foot segment and the second foot segment extends away from a second base, the second foot segment has a third minimum width $b_3$ in the innerly disposed transversal undercut region;

wherein, when the female end segment does not have an innerly disposed transversal undercut region with a second foot segment, the third minimum width $b_3$ equals zeros; and wherein $b_1:(b_{21}+b_{22}+b_3)$ is in a range from approximately 0.79 to approximately 1.27.

15. A fastener for bellows, comprising:
a male end segment and a female end segment complementary to the male end segment, each having a first transversal undercut region;

wherein a first width $b_1$ of the male end segment is determined by the minimum width of a first foot segment extending away from a first base in the first male transversal undercut region; and the female end segment includes first and second outer longitudinal segments that have respective second minimum widths $b_{21}$ and $b_{22}$ in the region of the first female transversal undercut region;

wherein the female end segment has an innerly disposed transversal undercut region with a second foot segment and the second foot segment extends away from a second base and the second foot segment has a third minimum width $b_3$ in the innerly disposed transversal undercut region and a ratio of $b_1:(b_{21}+b_{22}+b_3)$ is in a range from approximately 0.85 to approximately 1.27.

16. The fastener of claim 15, wherein the first foot segment on the first base has a greater width $b_4$ than the first width $b_1$.

17. The fastener of claim 15, wherein provided at the first base of the male end segment are at least two lengthening segments that may be arranged in complementary recesses of the female end segment.

18. The fastener of claim 15, wherein lateral surfaces formed by the first foot segment are embodied at an acute angle W to lateral transverse surfaces embodied in the first male transversal undercut region by first and second extension parts.

19. The fastener of claim 15, wherein a length l of the male and female end segments is shorter than a total width b of the fastener.

* * * * *

UNITED STATES PATENT AND TRADEMARK OFFICE
CERTIFICATE OF CORRECTION

PATENT NO. : 10,082,165 B2  
APPLICATION NO. : 15/333532  
DATED : September 25, 2018  
INVENTOR(S) : Markus Deisinger et al.

Page 1 of 1

It is certified that error appears in the above-identified patent and that said Letters Patent is hereby corrected as shown below:

In the Claims

Column 15, in Lines 44-45, replace "the ma female end" with -- the male and female end --.

Signed and Sealed this  
Twentieth Day of November, 2018

Andrei Iancu  
*Director of the United States Patent and Trademark Office*